F. K. CASWELL.
AUTOMATIC BRAKE SHOE MACHINE.
APPLICATION FILED DEC. 17, 1906.
973,167.
Patented Oct. 18, 1910.
9 SHEETS—SHEET 1.
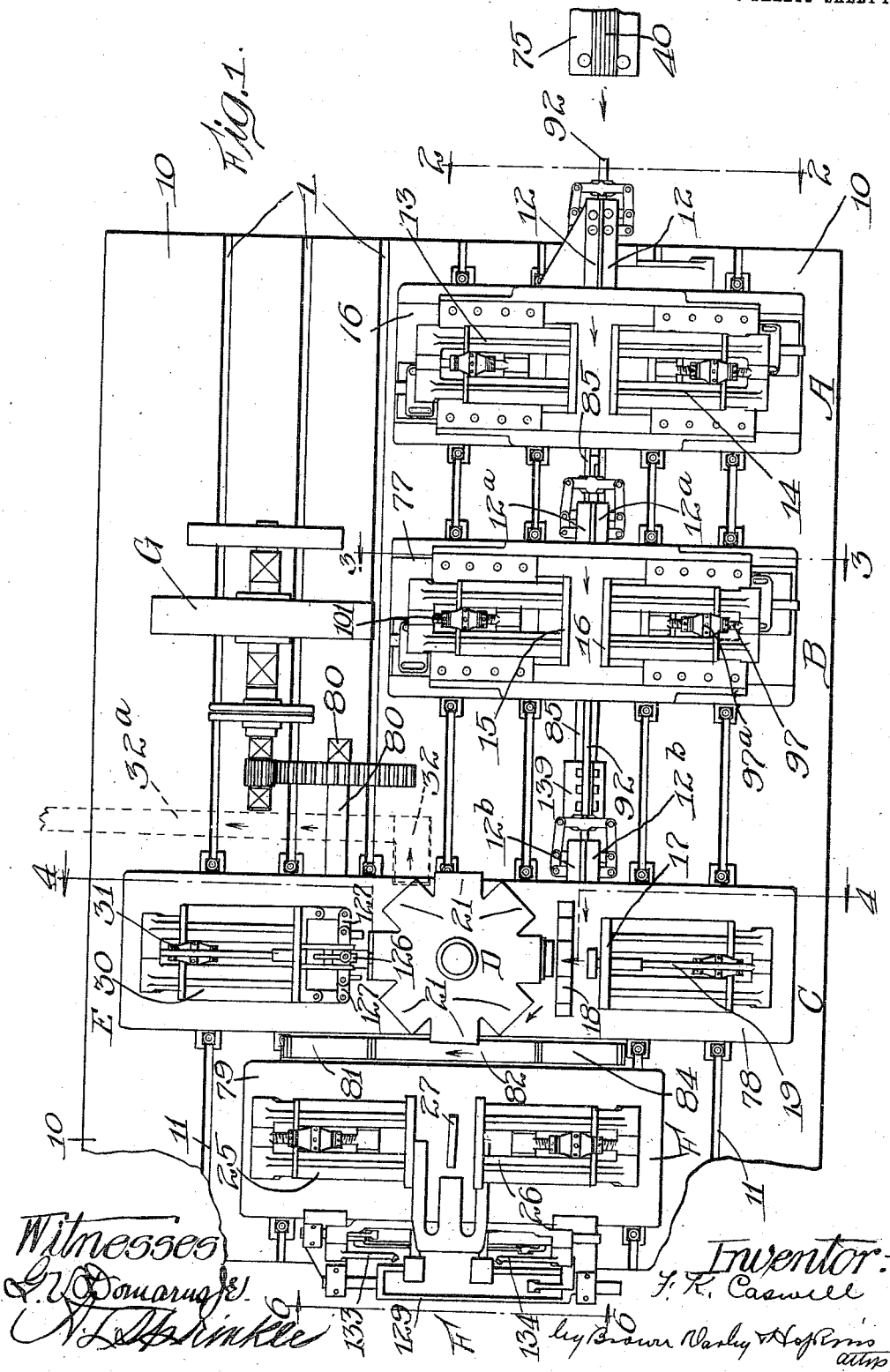

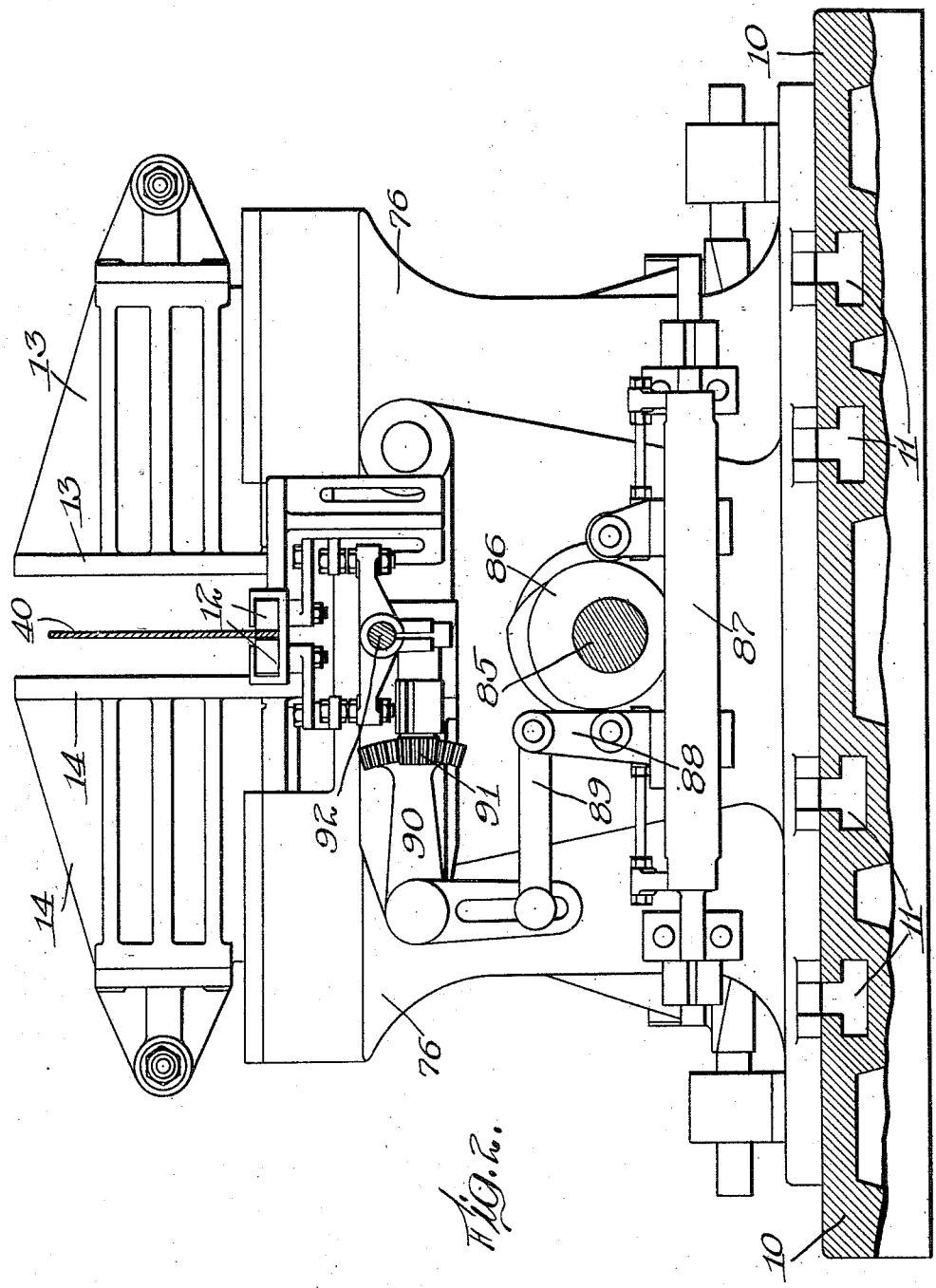

F. K. CASWELL.
AUTOMATIC BRAKE SHOE MACHINE.
APPLICATION FILED DEC. 17, 1906.
973,167.
Patented Oct. 18, 1910.
9 SHEETS—SHEET 3.
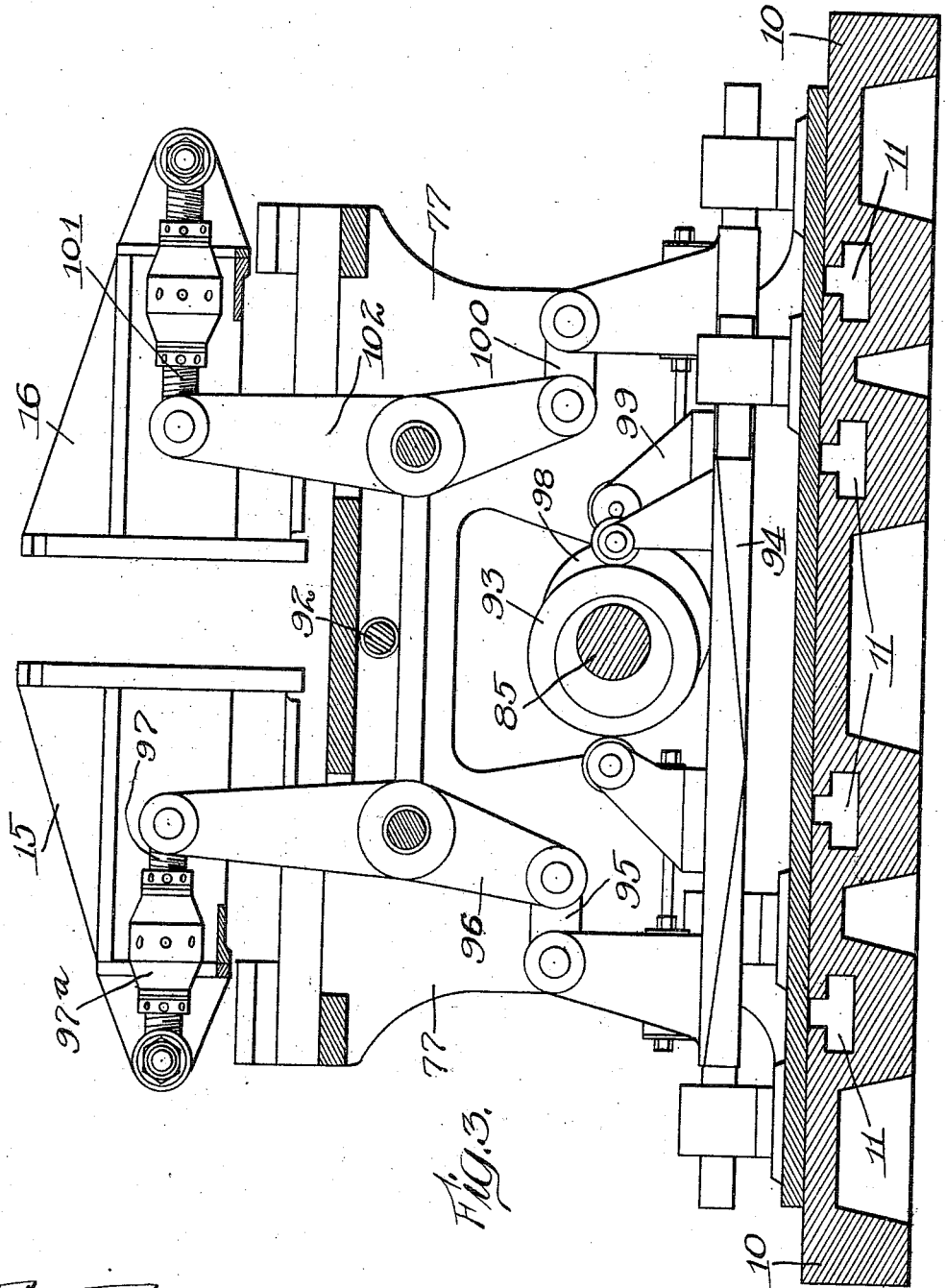

F. K. CASWELL.
AUTOMATIC BRAKE SHOE MACHINE.
APPLICATION FILED DEC. 17, 1906.
973,167.
Patented Oct. 18, 1910.
9 SHEETS—SHEET 4.
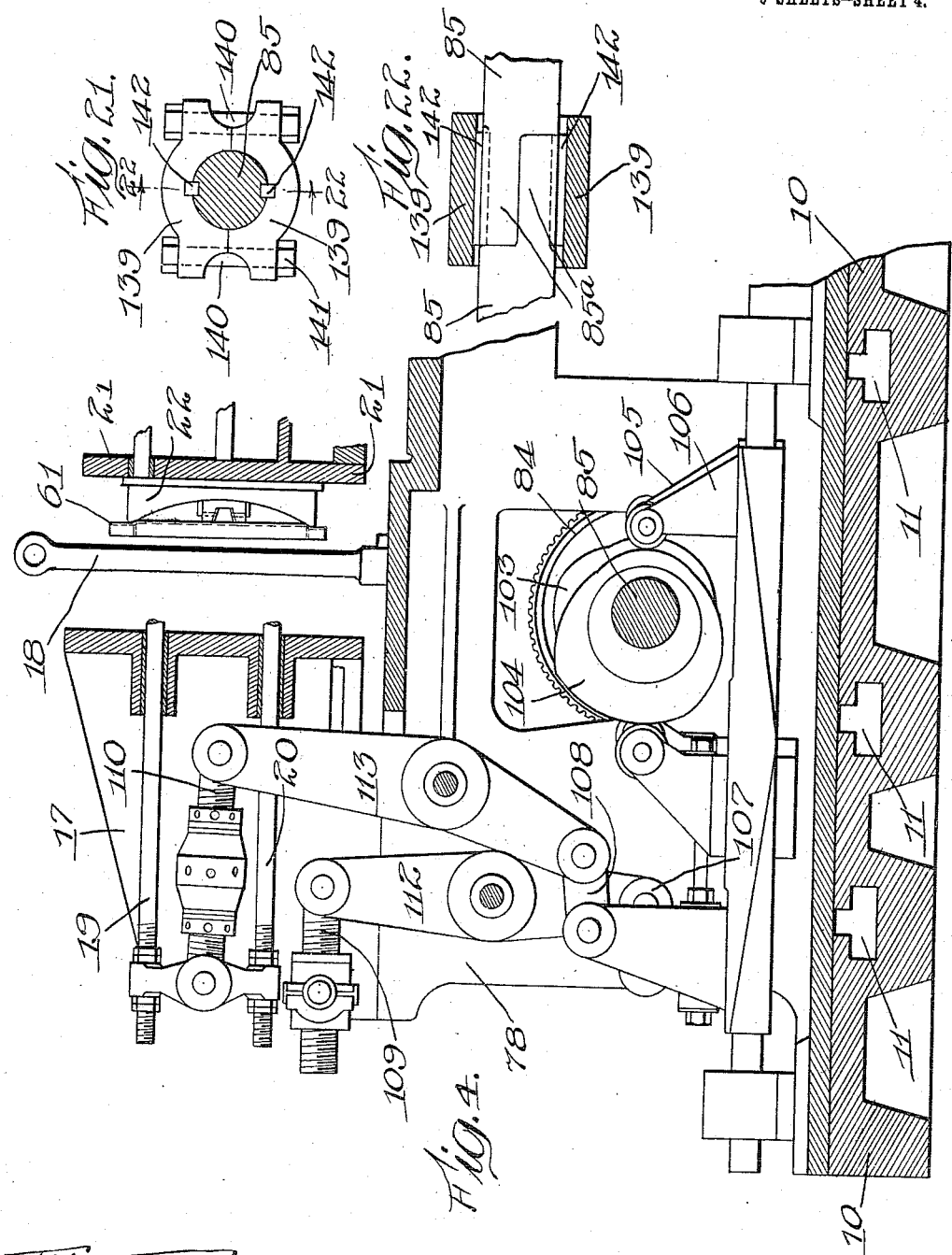

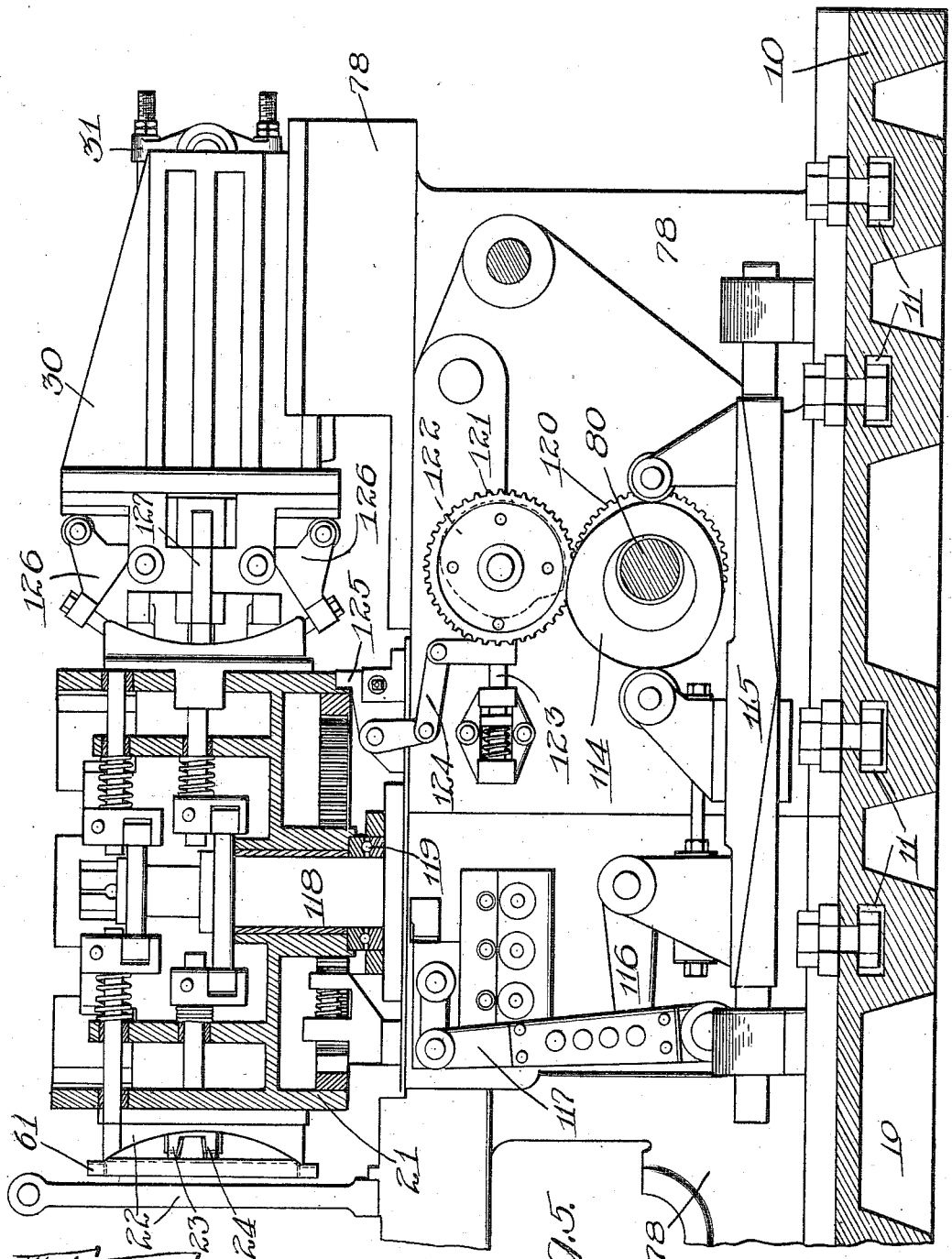

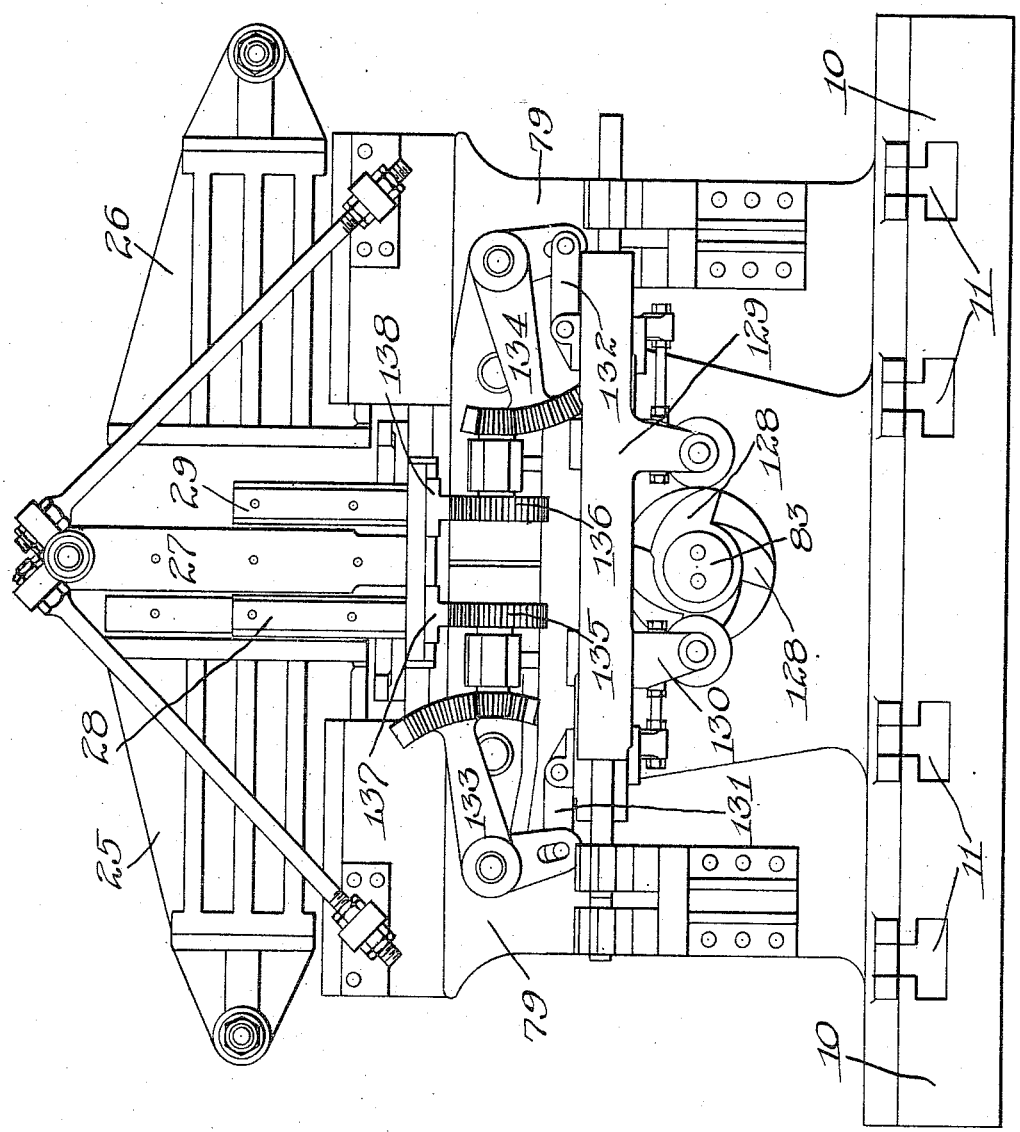

F. K. CASWELL.
AUTOMATIC BRAKE SHOE MACHINE.
APPLICATION FILED DEC. 17, 1906.
973,167.
Patented Oct. 18, 1910.
9 SHEETS—SHEET 7.
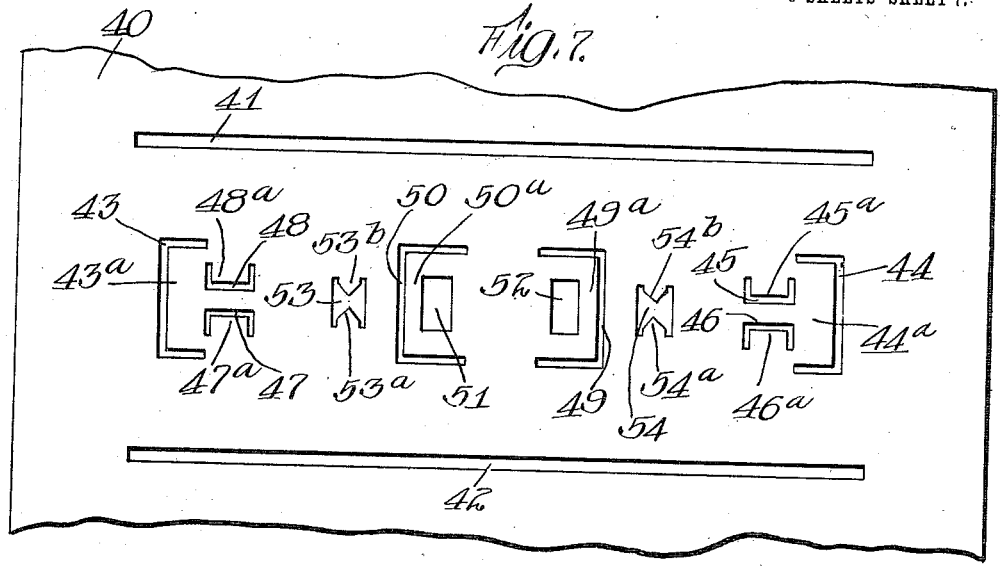
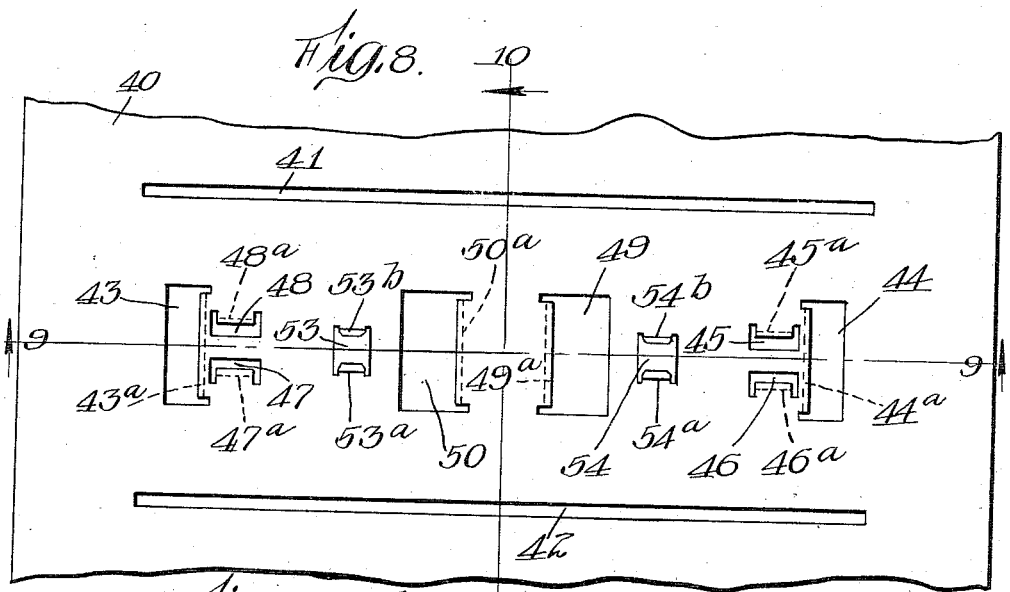
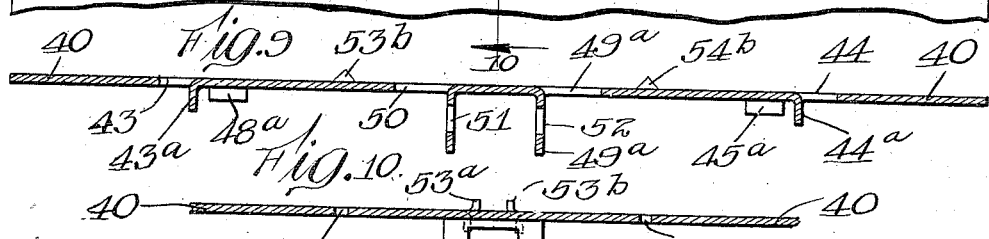

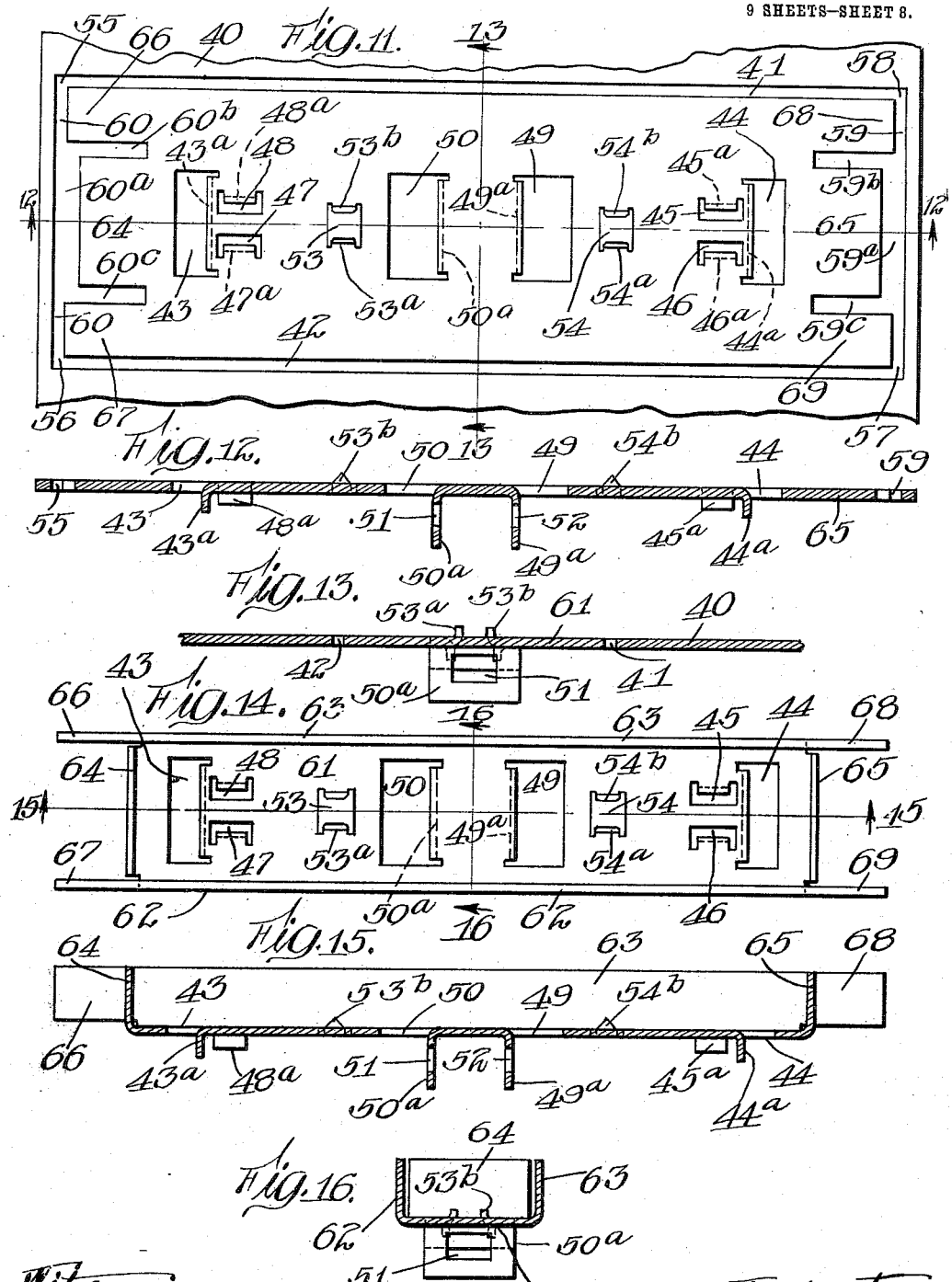

F. K. CASWELL.
AUTOMATIC BRAKE SHOE MACHINE.
APPLICATION FILED DEC. 17, 1906.
973,167.
Patented Oct. 18, 1910.
9 SHEETS—SHEET 9.
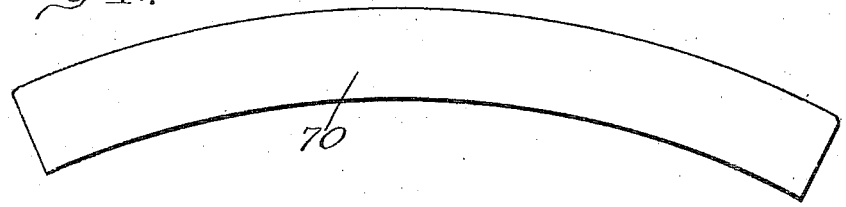
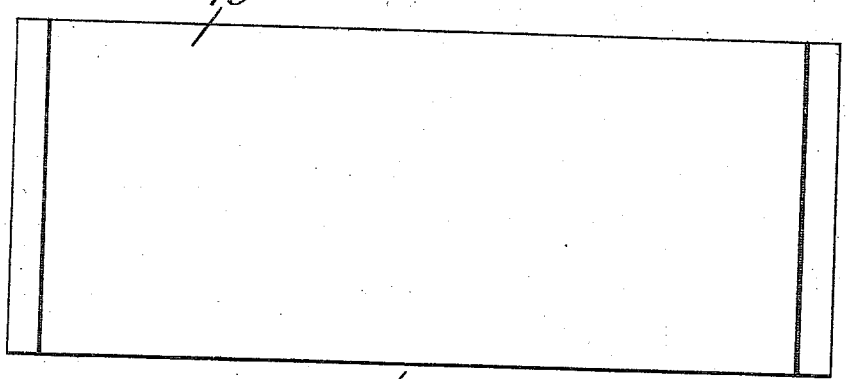
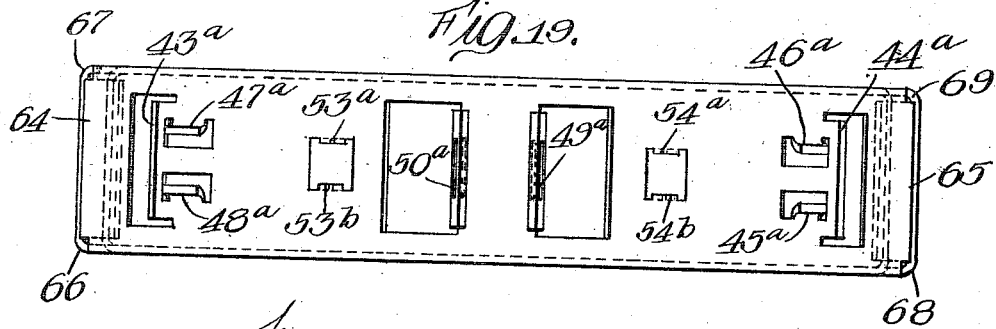
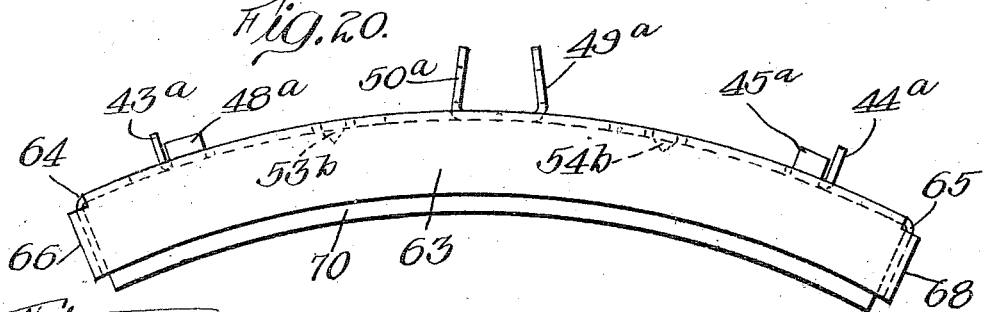

UNITED STATES PATENT OFFICE.

FREDERICK K. CASWELL, OF LOS ANGELES, CALIFORNIA, ASSIGNOR TO PAUL DICKINSON (INCORPORATED), OF CHICAGO, ILLINOIS, A CORPORATION OF WYOMING.

AUTOMATIC BRAKE-SHOE MACHINE.

973,167. Specification of Letters Patent. Patented Oct. 18, 1910.

Application filed December 17, 1906. Serial No. 348,172.

*To all whom it may concern:*

Be it known that I, FREDERICK K. CASWELL, a citizen of the United States, residing at Los Angeles, in the county of Los Angeles and State of California, have invented certain new and useful Improvements in Automatic Brake-Shoe Machines, of which the following is a full, clear, and exact specification.

My invention relates to improvements in machines for making brake shoes for use on the brakes of railway trains and the like, and particularly for making brake shoes of the general class described and claimed in my application for United States Letters Patent, Serial No. 321,650, filed June 14th, 1906, in which a shoe body possessing a high coefficient of friction is incased in a metal holder or shell.

The object of my invention is to provide an improved machine which will perform the work of making a complete brake shoe of the class described, in an efficient and economical manner and with a satisfactory degree of speed, and which machine will, furthermore, be readily adjustable and adaptable to the reception of interchangeable parts for making various sizes of shoes or for working various materials.

In order to produce an automatic machine for making brake shoes of the class described, I provide mechanism for receiving sheet metal as it comes from the rolling mills and performing a series of operations thereupon producing a casing or holder for the frictional or body substance of a brake shoe; mechanism for automatically receiving the shell from the forming mechanism; mechanism for preparing the material for the body substance of the shoe, mechanism for delivering the same to the shell and for inserting it therein; and finally, mechanism for completing the operation of firmly fixing the shoe body within the shell and for discharging the completed shoes. These various mechanisms in order to be effective in an automatic machine must have certain synchronous movements with relation to each other; and a further object of my invention is to provide improved means for permitting movements of the various mechanisms employed with relation to each other in order to readily admit of various adjustments made necessary by wear, or change in size or quality of the product to be made, or changes in materials to be used.

To the attainment of these ends and the accomplishment of other new and useful objects, as will appear, my invention consists in the features of novelty in the construction, combination and arrangement of the various parts, hereinafter more fully described and claimed, and shown in the accompanying drawings, illustrating an exemplification of this invention, and in which :—

Figure 1 is a plan view of the assembled mechanism which I employ in producing the complete brake shoe. For the purpose of greater clearness in referring to the other figures I divide the mechanism as illustrated in Fig. 1 into sections designated by the upper case letters A, B, C, D, E, F and G. Fig. 2 is a side elevation of mechanism designated by section A in Fig. 1, taken on line 2—2, Fig. 1. In this figure a portion of the base plate on which the mechanism rests is broken away in order to show the manner of adjustably attaching the machine thereto. Fig. 3 is a side elevation of mechanism designated by section B and is taken on line 3—3, Fig. 1. Figs. 4 and 5 taken together illustrate a view in side elevation of mechanism indicated by sections C, D and E, Fig. 1. These views are taken on line 4—4 of Fig. 1 and Fig. 4 has parts of sections C and D broken away to show the construction. Fig. 6 is an elevation of mechanism designated by section F, Fig. 1 and is taken on line 6—6. Fig. 7 is an illustration of the material used in forming the shell or holder for the brake shoe after the same has passed through the stamping or punching press, indicated by mechanism in section A, Figs. 1 and 2. Fig. 8 illustrates same material after passing through forming or bending dies carried by mechanism in section B, Fig. 3. Fig. 9 is a sectional view on line 9—9, Fig. 8. Fig. 10 is a sectional view on line 10—10, Fig. 8. Fig. 11 illustrates the succeeding operation, that of entirely severing the holder or shell blank from the original sheet. Figs. 12 and 13 are sectional views on lines 12—12 and 13—13 respectively, Fig. 11. Fig. 14 illustrates the holder or shell after the operation of bending the side and end members in order to prepare the same for the reception of the filling material. In the present embodiment of the invention the operation required to produce the shell as it appears in Figs. 11 and 14 follows immediately the operation on the same in section B. Both operations are produced by the double acting punching and forming mechanism in section C, Figs. 1 and 4. Figs. 15 and 16 are sectional views on lines 15—15 and 16—16 respectively, of Figs. 14. Figs. 17 and 18 are elevation and plan views of one form of the filling material or body substance to be inserted in my shell or holder at the stage of completion, the same as illustrated in Figs. 14, 15 and 16. Figs. 19 and 20 are plan and elevation views respectively, of a complete brake shoe made by my improved process. Fig. 21 is a view in elevation of the coupling device which is adapted for use in joining the ends of the main driving shafts of the various sections. Driving shaft is shown in cross section. Fig. 22 is a sectional view on line 22—22 of Fig. 21.

10 is a bed plate on which is adjustably mounted a series of mechanisms indicated by sections marked A, B, C, D, E, F and G respectively on Fig. 1. This plate is provided with a series of slots 11 adapted to take retaining bolts from various mechanisms mounted thereon.

The mechanism represented by the letter G refers to means of producing power for driving the associated mechanisms. The mechanism embraced in section A, illustrated more fully in Fig. 2, is adapted to receive material for forming the holder or shell of my brake shoe in the form of elongated strips or blanks. These blanks are preferably of the required thickness for forming the shell and of a width to correspond approximately to the length required to make the completed shell. This material may be fed to the machine in strips of any desired length, although for convenience in handling, I prefer to have the material come from the mills in strips about 20 ft. in length. A portion of one of such strips is indicated by 40. Suitable feeding mechanism may be employed in connection with the mechanism in section A, as for example, the movable jaws 12, to grasp a bar or strip of this sheet metal and feed it longitudinally through the mechanism in the direction indicated by the arrow in section A. Suitable cutting or punching dies here act upon the metal producing a series of cuts or slits in distinct groups, each group of such cuts or slits adapted to blank out the material to be embodied in a single shell or holder and consisting of the elongated side slits 41 and 42 which extend at approximately right angles to the length of the strip but are not cut entirely through the strip at the ends thereof. This manner of blanking out the holders preserves the entire strip of material intact so that it may be fed further through the machine for succeeding operations.

By reference to Figs. 7 to 16 inclusive it will be seen that slits or cuts 41 and 42 determine the width of the completed blank for forming the shell. The irregular slits or cuts 43 to 54 inclusive extend longitudinally of the shell or blank midway between the slits 41 and 42 and are for the purpose of providing means for attaching the brake shoe at its back to the brake block or head. Cuts 43, 44, 45, 46, 47 and 48 surround members $43^a$, $44^a$, $45^a$, $46^a$, $47^a$ and $48^a$ respectively. These last members are all adapted to bend or form outwardly from the back of the blank for the purpose of forming members at each end of the shoe to take both endwise and lateral strains. Cuts 49 and 50 form members $49^a$ and $50^a$ which are likewise adapted to be bent outwardly to form middle supports in attaching the brake head. The rectangular holes 51 and 52 formed in members $49^a$ and $50^a$ are for the purpose of taking an ordinary retaining key or pin used on the common Christy or M. C. B. head. It will be seen that the various cuts performed on blank shown in Fig. 7 may be made at one operation of the punching die carried by the mechanism in section A. It will be noted that this mechanism performing the first operation on the blank is a double headed single acting press in which the movable heads 13 and 14 are adapted to carry the dies. In Fig. 2 a section of bar 40 of sheet metal is shown in position in feeding mechanism. The die or dies for performing this operation and their coöperative members are not shown. It is evident that a single headed press may be used as well in performing this operation for the reason that it is a simple punching operation and as no bending out of the planes of the sides of the material takes place while the material is in this mechanism it may readily be disengaged by the feeding mechanism in order that it may be passed on to the next mechanism for further treatment.

After the sheet of material receives the cuts illustrated in Fig. 7 it is next passed by feeding means to the mechanism illustrated in Fig. 1 section B, also shown in enlarged form in elevation in Fig. 3. This mechanism as shown is a duplicate of the double headed press described in previous operation and it is also provided with feeding mechanism containing jaws $12^a$ as illustrated in Fig. 1. During the passing of the material through this mechanism it is acted upon in the manner indicated in Fig. 8. It will be noted that the process is entirely one of forming or bending of the members $43^a$ to $50^a$ inclusive at approximately right angles to the plane of the blank as indicated more clearly by reference to Fig. 9. All of the last mentioned members it will be noted, are bent outwardly from the blank on the same side thereof and on the side which afterward becomes the back side or the outside of the shell. It will also be noted that in this mechanism members 53ª, 53ᵇ, 54ª and 54ᵇ are formed outwardly from the plane of the blank but on the opposite side of the blank from members just mentioned and on the side that afterward becomes the inner side of the shell. It will be noted that this operation leaves the shell blank still intact with the material in sheet form and that to perform this operation of bending it is necessary that the double headed form of press be employed in order to free the sheet of material from contact with the dies as the surface of the material is no longer smooth as it was after the first operation. In the mechanism shown in section B, Figs. 1 and 3, numerals 15 and 16 indicate the movable members of the press which carry the forming dies corresponding to parts 13 and 14 in mechanism section A.
In the mechanism just described, the blanks still intact in the original sheet are fed onwardly to the mechanism indicated by sections C, D, E and F. The sheets first enter mechanism indicated in Fig. 1, section C shown also in enlarged elevation in Fig. 4 where they are seized by feeding mechanism similar to that already described and indicated by the grasping jaws 12ᵇ, section C, Fig. 1. By reference to the mechanism in section C, more particularly the enlarged view in Fig. 4, it will be seen that the material is acted upon by a single headed double acting press. The movable member indicated by the numeral 17 may carry a cutting tool for performing the first operation on blank in this section as illustrated in Figs. 11, 12 and 13. This operation it will be noticed consists in entirely severing the blank from the metal sheet and continuing the elongated slots 41 and 42 toward the sides of the sheet terminating at corners 55 to 57 respectively, where each slot makes a right angle turn extending in the direction of the opposite slot, forming the connecting slots 59 and 60 and enlarged slots 59ª and 60ª, and the diametrically opposed and inwardly extending branches 59ᵇ, 59ᶜ, 60ᵇ and 60ᶜ.
The cutting operation just described, results in severing the blank designated by the numeral 61, Figs. 11 to 16 inclusive, and before the cutting tool is withdrawn, in order to prevent the release and displacement of the blank 61 from the position in which it is held by reason of the contact of the tool carried by head member 17 which forces the blank against supporting member 18, bending or forming die carried on movable members 19 and 20 moves forward and firmly holds the blank against supporting member 18 thus allowing the cutting die carried on member 17 to be withdrawn. The action of the forming die or tool carried on members 19 and 20 is continued, thus crowding the blank into forming means on member 18 bending upwardly into position the side members indicated by the numerals 62 and 63, Figs. 14 and 16, at the same time the end members indicated by numerals 64 and 65 Figs. 14 and 15 are formed upwardly into position from the plane of the blank. During this operation the shell blank is crowded entirely through member 18 by the forming tool and placed in the position indicated by the shell 61 shown in dotted lines on turret wheel 21, Figs. 4 and 5. The forming tool which has accomplished the result of placing the shell in position on rotating wheel 21 is then withdrawn, movement is imparted to wheel 21 by which it is caused to rotate in the direction of the arrows as indicated in Fig. 1. Before another operation is performed on the shell it is carried by the wheel 90 degrees, thus placing it in position to receive filling material or body from mechanism illustrated by section F, Fig. 1, which mechanism is also shown in enlarged elevation view in Fig. 6.
As a body or filler for the shoe, various vegetables and mineral substances and compositions have been used and with varying success. In order that the completed shoe may have the proper frictional qualities for contacting with the moving surface on the wheels, material of great firmness is required. I prefer to use vegetable fiber, preferably wood, of the common varieties but ordinarily belonging to the classes of the hardwoods. This wood I previously treat by various well known processes; driving the vegetable juices therefrom and impregnating the fibrous substance with carbon oils. Before being presented to the mechanism in section F blocks of previously treated wood are given the shape indicated by numeral 70, Figs. 17 and 18. The mechanism in section F is more fully described and is also claimed in application for Letters Patent of even date herewith. It is designed to compress block 70 laterally to one-half its width. As illustrated in Fig. 18, 70 is approximately double the width of the interior of the shell as illustrated in Figs. 14, 16 and 19. It will be noted that the shell 61 has not yet been given the necessary curvature to correspond with the curvature of its contacting surface on the car wheel, although by reference to the holder form 22 Figs. 4 and 5, it will be seen that the form itself has the requisite degree of curvature. The members 23 and 24 which hold the shell by grasping the members 49ª and 50ª on the back of shell are elastically mounted in order that they may withdraw toward the convex side of the curve of this form when it is desired to give the shell its proper degree of curvature. This I prefer to accomplish at the same time the filling block is inserted by the mechanism in section F. Movable members 25 and 26 in section F are adapted to perform the described operation of compressing the wood which they do by acting in conjunction with the fixed member 27. After the blocks are compressed they are grasped by suitable feeding mechanism, as for example, the reciprocating members 28 and 29. I prefer to make these reciprocating members of sufficient strength to permit of very firm pressure being applied thereby in inserting the filling blocks into the shell. The convex face of the block is first presented to the shell, and after being inserted sufficient pressure is applied to cause the shell to assume the proper degree of curvature to correspond with the filling block, which degree of curvature is also approximately the same as that of the shell holding block or form 22 previously described. In construction shown it will be noted that I employ a double headed press for compressing the filling material which makes it necessary to employ the double inserting mechanisms 28 and 29. These inserting mechanisms work alternately, one presenting a block of wood to the shell, while the other mechanism is holding a block under pressure. The shell, with filling material inserted therein, in the manner just described, is next presented to the mechanism indicated by section E, Fig. 1 and is also shown in side elevation in Fig. 5, together with a section of turret wheel 21 and its adjacent mechanism previously referred to as section D, Fig. 1.

Final operations in making a completed shoe are performed by mechanism in section E in which mechanism for carrying forming tools of similar construction referred to in section C is employed. This consists of what may be termed a single headed double acting press. The reciprocating head or ram 30 actuates suitable mechanism for compressing the side members 62 and 63 in order to cause them to contact closely with the filling material. These side members of the shell, as they leave the mechanism in section C, are not quite at right angles to the back of the shell. The action of the forming mechanism in section C will bring them to the right angle position but the elasticity of the metal causes them to spring apart slightly which is of value in the process in permitting the insertion of the filling material. By referring to Fig. 11 it will be noted that in the operation of severing the shell blank from the sheet material auxiliary end members 66 to 69 inclusive were formed. The position these members assume after the process of folding the sides and ends of the shell, is shown by referring to Figs. 14 and 15. Immediately after the operation just described, of closing the side members 62 and 63, and before the pressure is released, the second section 31 of reciprocating member of ram actuates suitable bending and compressing mechanism to fold members 66 and 67 inwardly and around end members 64, and members 68 and 69 likewise around end member 65. The position of these parts on the completed shoe is shown by reference to Figs. 19 and 20. This operation completes the shoe and it is carried by the turret wheel 21 from contact with the mechanism in section E and discharged at any convenient point before the shoe is carried by the turret wheel into juxtaposition with the mechanism in section C. Any convenient form of receiving and conveying mechanism as indicated by 32 and $32^a$ may be employed for this purpose.

Any desired number of inwardly extending barbs similar to $53^a$, $53^b$, $54^a$ and $54^b$ may be employed. The material is impaled on these barbs at the time of its insertion in the shell by the mechanism in section F. This construction assists in retaining the filling material more firmly in the shell and is a feature which is particularly desirable on account of the adaptability of a brake shoe of my construction to withstand wear until the filling material and sides of the shell have been practically worn away.

75 (see Fig. 1) is any convenient form of holding device or mechanism for retaining a quantity of sheets of material for insertion in the mechanism and between feeding jaws 12.

76 is the main frame upon which mechanism section A is mounted. 77 is a similar frame carrying mechanism in section B. The frame for carrying mechanism in sections C, D and E may be integral as indicated in 78, or the mechanisms in these sections may be carried on separate frames if desired and secured by attaching them to each other and to bed plate 10.

79 is the frame supporting mechanism in section F and is somewhat similar in construction to 76 and 77.

80 is shaft mounted on frame 78 transmitting power to the entire mechanism through spur gear 81 which is geared into 82 mounted on shaft 83 imparting motion to mechanism in section F. 82 also meshes with spur gear 84 mounted on shaft 85 which shaft passes continuously through sections A and B, as will be seen by referring to Fig. 1. Cam 86 mounted on shaft 85 imparts reciprocating motion to member 87 and which in turn acting on members 88 and 89 and segmental bell crank 90 gear 91 and any suitable rack and pinion movement imparts reciprocating movement to shaft 92. Shaft 92 may extend to mechanism in sections A, B and C thereby actuating feeding mechanisms of those sections synchronously.

By reference to Fig. 3 the form of mechanism I prefer to employ for reciprocating the two carrying heads or rams in various presses will be seen. 93 is an eccentric cam on shaft 85 imparting reciprocating motion to member 94 which imparts movement to member 15 through links 95 and 97. Link 97 may be adjustable by turn buckle 97$^a$ for the purpose of making slight adjustments. Mechanism for operating member 16 including eccentric cam 98, reciprocating member 99, links 100 and 101 and lever 102, is similar to that just described.

Mechanism employed in Fig. 4 for actuating the double acting press is similar to that just described including cams 103 and 104, reciprocating members 105 and 106, links 107, 108, 109 and 110, and levers 112 and 113. Eccentric cam 114 (see Fig. 5) and reciprocating member 115 are adapted to impart motion to turret or carrying wheel 21. This may be accomplished by link 116, reciprocating lever 117 and any convenient form of construction connected thereto as for example, familiar pawl and ratchet mechanism. 118 represents the axis on which turret wheel 21 is rotated; ball bearings or other antifriction means as indicated at 119 may be employed. Gear 120 carried by shaft 80 meshes with gear 121 thereby actuating cam 122. This cam acting on spring controlled reciprocating member 123 and connecting link 124 controls stop 125 which is provided for the purpose of checking turret wheel 21 at predetermined intervals thus presenting the holding and forming members 22 mounted thereon to the mechanism in sections C, F and E in the proper relation, in order that the heretofore described operations may be performed on the materials carried by the wheel. Bell cranks 126 are acted upon by member 31 in manner previously described and carry the tools for folding the auxiliary end members of the shell, and members 127 carry the tools for finally compressing the sides of the shell, both of which operations have been previously described.

The eccentric cams 128 (see Fig. 6) pass reciprocating motion to members 129 and 130 which in turn actuate members 28 and 29 through links 131 and 132, segmental gears 133 and 134, toothed pinions 135 and 136 and racks 137 and 138, movements similar to that previously described for actuating the feeding mechanism section A. Rams or heads 25 and 26 are actuated from shaft 83 by mechanism similar to that previously shown and described, (see Fig. 3).

In a machine of this character and complexity it is very essential that provision be made for adjusting the various mechanisms with relation to each other. Such adjustments are made necessary by the inevitable wear on the parts, and the various sizes of brakeshoes that may be produced. For example, it is common to use one form and size of brakeshoe on the trucks of freight cars, another form for passenger coaches, and other various forms and sizes on the driving wheels and tender trucks of locomotives; tram cars or street cars also require another size. Slots 11 in bed plate or foundation 10 adapted to take retaining bolts in main frame of the various mechanisms have already been described. In order that the mechanisms in sections A, B and C may be readily adjusted with reference to each other it is necessary that main driving shaft 85 be made in detachable sections with a section common to the main frame in each section. Such adjustable means for uniting the ends of shaft 85 may be seen by referring to part indicated by numeral 139, Fig. 1, also by reference to enlarged detail views in Figs. 21 and 22 in which shaft 85 is shown, provided at its ends with the overlapping members or tongues 85$^a$ which are surrounded and held together by divided collar 139 which is held in position around the divided ends 85$^a$ of the shaft by retaining bolts 140 threaded and provided with suitable nuts 141. In order to hold the parts more firmly in position, corresponding grooves or channels may be provided in the ends of the shaft and in collar 139 and splines or keys 142 inserted.

In order that the invention might be fully understood the details of an embodiment thereof have been thus specifically described, but

What I claim is:—

1. In a machine for making brake shoes in combination, a bed plate embodying a plurality of punching and forming presses, conveyer mechanism adjacent said punching and forming presses and adapted to receive cut and formed brake shoe shells therefrom, means in the path of said conveyer means adapted to insert filling material in the brake shoe shells carried thereby, means for producing a synchronous movement throughout said punching, forming, conveyer and body inserting mechanisms, and means for adjusting said mechanisms on said bed plate.

2. In a device of the character described, the combination of a plurality of mechanisms adapted to perform a series of cutting and forming operations on sheet metal, means for adjusting said mechanisms in relation to each other, and means adapted to feed material to said mechanisms, said feeding means embodying a series of movable jaws arranged in pairs and adapted to seize material being acted upon by said mechanisms and to advance the same synchronously throughout the series of mechanisms.

3. In a device of the character described, the combination of a plurality of mechanisms adapted to perform a successive series of punching and forming operations on sheet metal, means for adjusting said mechanisms in relation to each other, and feeding means adapted to seize sheet metal material and to advance the same with a synchronous movement throughout the several mechanisms.

4. In a device of the character described, the combination of a plurality of mechanisms adapted to perform a successive series of operations on sheet metal for the purpose of forming brake-shoe holders or shells, means for adjusting said mechanisms in relation to each other, feeding means adapted to present sheet metal material to said mechanisms and to advance the same synchronously throughout the said series of mechanisms, a movable carrier adjacent to said holder or shell forming mechanisms adapted to receive completed shells or holders, means in the path of said carrier adapted to insert a block or body of filling material into said shells or holders, means in the path of the carrier adapted to fold the sides and ends of the holders or shells into contact with said block or body of filling material, and means for discharging the completed brake-shoes from the carrier.

5. In a device of the character described, the combination of mechanism adapted to form a shell or holder for brake shoes, said shell being provided with a back member and having side members and end members formed integral therewith and folded at an angle thereto, conveying means adapted to receive said shell or holder from said forming mechanism, means for actuating said conveying means, means adjacent to the path of said conveying means adapted to insert a prepared block or body of frictional material into said shell or holder, and means in the path of said conveyer adapted to fold the sides and ends of said shell into contact with said block or body of frictional material.

6. In a machine for making brake shoes, the combination of means adapted to form brake shoe shells or holders from sheet metal, embodying punching and forming mechanism, means adapted to feed sheet metal to said punching and forming mechanism, carrying mechanism adapted to receive brake shoe holders or shells from said punching and forming mechanism, means in the path of movement of said carrying means adapted to insert a body material or filling into said shells or holders, means within the path of said carrying mechanism adapted to fold the walls of the shells or holders into contact with the filling material, and means for discharging the brake shoe thus formed from said carrying mechanism.

7. In a machine for making brake shoes, the combination of means adapted to cut and form holders or shells from sheet metal, a conveyer adapted to receive said holders or shells from said punching and forming mechanism, means for actuating said conveyer, means within the path of said conveyer adapted to insert prepared bodies or blocks of filling material into said holders or shells, means adapted to compress the back surface of said filling material into contact with the back member of said holders or shells, means within the path of said conveyer adapted to fold and press the sides and ends of said holders or shells into contact with said filling material, and means adapted to disengage the completed brake shoe thus formed from said conveyer.

8. In a machine for making brake shoes, the combination of means carrying cutting and forming tools adapted to blank holders or shells from sheet metal, means for carrying and presenting sheet metal to said cutting and forming means, conveying means adapted to receive said brake shoe holders or shells from said cutting and forming means, means for actuating said conveying means, means within the path of said conveying means adapted to insert a body or block of filling material into said holder or shell, means for exerting pressure on said filling material and shell to cause said holder or shell to conform to the back, side and end surfaces of said filling material, and means adapted to disengage the completed brake shoe thus formed from said conveying mechanism.

9. In a machine for making brake shoes, the combination with punching and forming mechanism adapted to produce shells or holders for brake shoes from sheet metal embodying a back member and side members and end members formed integral therewith, of carrying means adapted to receive said holders or shells from said punching and forming mechanism, said carrying means embodying a plurality of supporting blocks having their outward faces curved to conform to the degree of curvature of a brake shoe and being provided with means for retaining a brake shoe shell or holder in position adjacent to said curved surface, mechanism adjacent to the path of said carrying means adapted to present blocks or bodies of filling material to said shells or holders, said means being adapted to insert said blocks or bodies of filling material into said shells under sufficient pressure to cause the back members thereof to conform to the curved surfaces of said retaining supports on said carrying means, means adjacent to said carrying means adapted to compress the sides and ends of said holders or shells into contact with said filling means, and means adapted to discharge said shell and said filling means from said carrying means.

10. In a machine for making brake shoes, the combination of means adapted to form a shell, means adapted to insert a filling body in the shell, means adapted to secure the filling body within the shell by bending the walls inwardly and into contact with the filling body, and conveyer mechanism for moving sheet metal through said shell forming means and for presenting the completed shell to the filling means, embodying a series of reciprocating grasping jaws, and a pivotally mounted turret wheel.

In testimony whereof I have signed my name to this specification, in the presence of two subscribing witnesses, on this 11th day of December A. D. 1906.

FREDERICK K. CASWELL.

Witnesses:
M. W. CANTWELL,
A. L. SPRINKLE.